United States Patent Office 3,488,929
Patented Jan. 13, 1970

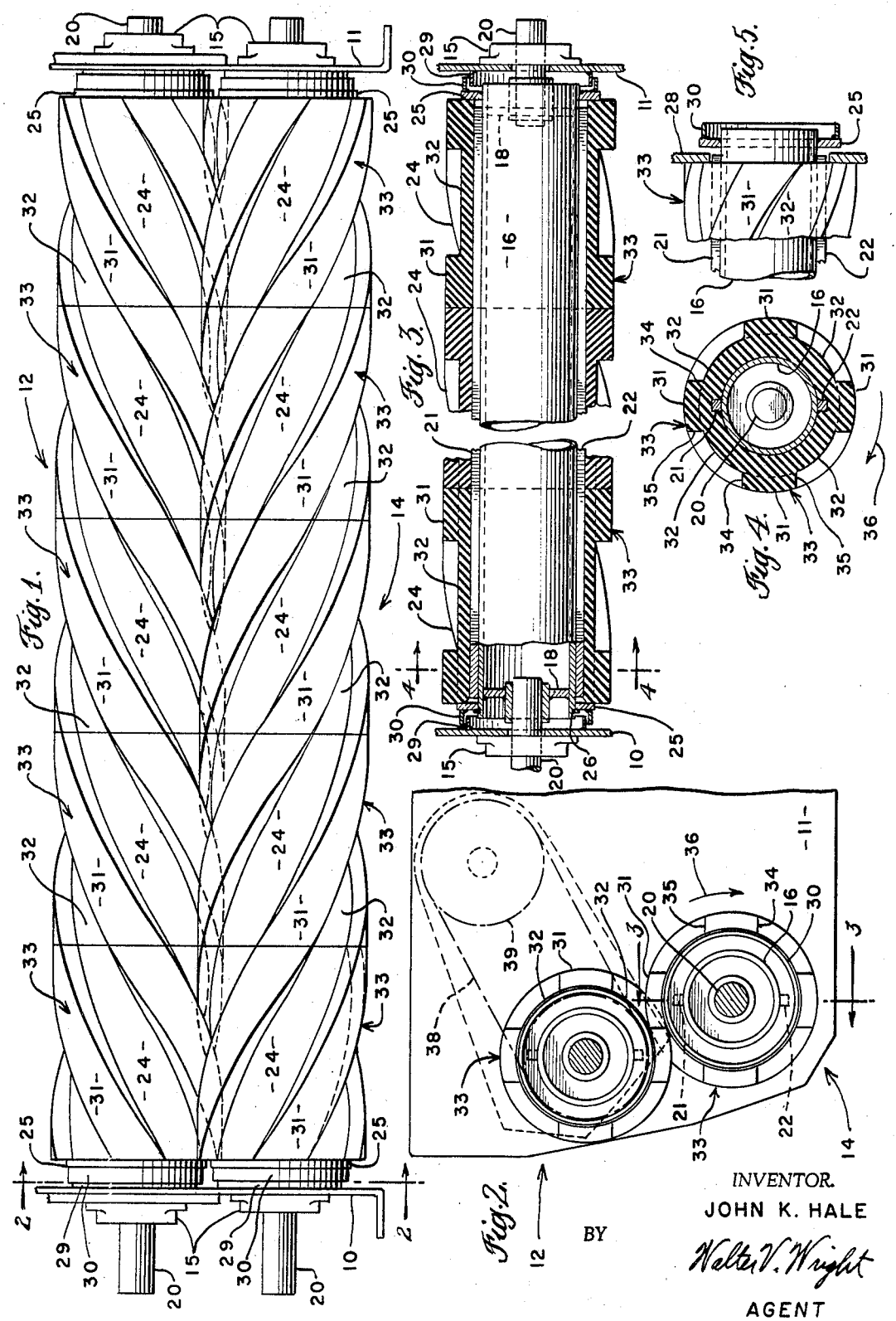

3,488,929
HAY CONDITIONER
John K. Hale, New Holland, Pa., assignor to Sperry Rand Corporation, New Holland, Pa., a corporation of Delaware
Continuation of application Ser. No. 482,775, Aug. 26, 1965. This application Oct. 22, 1968, Ser. No. 770,141
Int. Cl. A01d 49/00
U.S. Cl. 56—1                                    9 Claims

ABSTRACT OF THE DISCLOSURE

A hay conditioning device disposed in a mobile frame comprising a pair of horizontally extending conditioning rolls mounted one above the other, each roll having a plurality of spiral ribs and recesses therearound and the ribs and recesses of one roll intermeshing with the ribs and recesses of the other roll forming a forwardly directed crop receiving bite, the rolls operating to crush and crimp hay passed between them as the rolls are rotated.

---

This application is a continuation of my application Ser. No. 482,775, filed Aug. 26, 1965, now abandoned.

This invention relates generally to agricultural machinery used in harvesting hay crops or the like. More particularly, this invention relates to a new construction and coaction of a pair of hay conditioning rolls.

It is now common harvesting practice when mowing a crop of hay or the like to subject the crop to a "conditioning" operation. This operation consists of passing the crop between a pair of parallel coacting rolls to break open the hard outer shell of the stems of the stalks to facilitate the escape of moisture from the interior of the stems. This enables the stems to dry, or cure, to the desired moisture content for further harvesting operations in substantially the same length of time as the leaves, thereby decreasing the harvesting time as well as yielding a more uniformly cured and more valuable harvested crop.

In the conditioning operation, the crop stalks normally pass between the conditioning rolls with the stems generally perpendicular to the axes of the rolls. One current type of conditioning operation, known as crimping, employs a pair of rolls having narrow longitudinally extending radially fins. The two rolls are mounted on a frame in such a manner that the fins of the two rolls intermesh without touching. In passing between the intermeshing fins, the stem of a hay stalk is cracked open transversely at regular intervals along its length. Crimper rolls are characterized by their aggressive feeding and stem cracking action. However, they are rough and vibrant in operation and attack the stems only at spaced intervals, leaving pockets of trapped moisture between successive transverse cracks. The other type of conditioning operation, known as crushing, employs a pair of relatively smooth rolls which coact to crush the stems of stalks passing therebetween. In passing between the crushing rolls, the stem of a hay stalk is cracked open longitudinally along its full length, leaving no pockets of trapped moisture. However, neither the feeding action nor the stem cracking action of the crushing rolls is normally as aggressive as that of the crimper. Hence, a crusher is more apt than a crimper to become plugged or to fail to completely break open the stem shell. Many compromise designs have been employed, such as: coacting rolls of different diameters; and, one smooth roll of steel for its crushing action, coacting with another smooth roll of rubber, for its aggressive feeding action. Crushed rolls made of various materials and with various surface tread patterns have also been employed in an effort to increase the aggressiveness of the crusher.

In spite of the advancements made in crusher roll designs, the different characteristics of the two basic types of hay conditioners still exist, and the farmer must sacrifice the advantageous quality of one or the other type when he chooses a conditioner.

It is an object of this invention to provide a pair of coacting hay conditioning rolls having the aggressive feeding and stem cracking characteristics of a crimper while providing the full conditioning action of a crusher.

It is an object of this invention to provide a pair of quiet running, relatively vibrationless coacting hay conditioning rolls having an aggressive full conditioning action.

It is another object of this invention to provide a rugged, yet economical hay conditioning roll construction.

Another object of this invention is to provide a hay conditioning roll design and construction which lends itself readily to inexpensive repair, should the roll become damaged in operation.

It is another object of this invention to provide a hay conditioning roll design and construction which facilitates the economic manufacture of rolls of different standard lengths.

These and other object and advantages of this invention will be apparent upon reference to the following description and claims taken in conjunction with the accompanying drawings wherein:

FIG. 1 is a rear elevational view of a hay conditioning roll assembly constructed in accordance with the principles of the present invention;

FIG. 2 is a sectional view taken on the line 2—2 of FIG. 1;

FIG. 3 is a sectional view taken on the line 3—3 of FIG. 2;

FIG. 4 is a sectional view taken on the line 4—4 of FIG. 3; and

FIG. 5 is a fragmentary elevational view of a roll during its assembly process.

Referring now to the drawings in detail, particularly to FIG. 1; the reference numerals 10 and 11 indicate, respectively, the side frame plates of a conventional hay conditioning device as shown, for example, in U.S. Patents 2,954,656 or 3,006,124, or as commonly used on swathers or other mower-conditioner implements. Upper and lower crop conditioning rolls generally indicated, respectively, by the reference numerals 12 and 14 extend transversely between side frame plates 10 and 11 and have their respective ends mounted on the plates by conventional roller journals 15. The rolls have horizontally extending axes forming a crop material receiving bite facing forwardly, as shown in FIGURE 2 and as shown in the mentioned patents.

Generally speaking, each of the rolls 12 and 14 has an outer periphery comprised of alternate spiral ribs and recesses. As is apparent in FIG. 1, the spirals of the respective rolls have equal but opposite angular pitch. Other than the opposite direction of pitch of the ribs and recesses, the two rolls are of identical construction; thus, the following detailed description of the roll construction is applicable to either roll. With reference to FIG. 3, the roll has a hollow rigid cylindrical central core member 16. The cylinder 16 carries internal end closure members 18 which fixedly support spindles, or shafts, 20. The spindles 20 extend laterally through openings in the respective side frame plates 10 and 11 and are rotatably supported in the roller journals 15. Longitudinally extending keys 21 and 22 are welded, or otherwise fixedly disposed at diametrically opposed sides of the cylindrical core member 16. The keys extend substantially the full operative length of the roll. A plurality of cylindrical sleeve members 24 (five in number in FIG. 1) are received axially in end to end abutting relation on cylindrical core member 16. Naturally, the sleeve members 24 are provided with appropriate diametrically opposed keyways (no reference numeral) to receive the keys 21 and 22. The keys 21 and 22 lock the sleeve members 24 against circumferential movement relative to core member 16.

The sleeve members 24 are fixed axially on core member 16 by ring plates 25 carried on the outer surface of central core member 16 on the outboard side of the outer ends of the respective end sleeve members 24. The ring plates 25 may be fixed axially on the roll core 16 by any conventional known means such as snap rings, or by welding. A preferred method is illustrated in FIG. 3 wherein the end ring plate 25 at the left end of the roll is fixed axially by a snap ring 26 while the right end ring plate 25 is welded in place. In this manner, at least one of the retaining ring plates 25 may be removed to facilitate replacement of one or more damaged sleeve members 24.

The sleeve members 24 are preferably formed of hard rubber, or other hard but resilient material. In FIG. 5, a final step in the roll assembly process is shown. An annular plate 28 operatively connected to a hydraulic press, or the like, compresses the endmost sleeve member 24 axially onto core member 16 and retains the sleeve member in a compressed state while the end retaining plate 25 is positioned on the core member 16 and welded in place. Upon cooling of the weld, the press plate 28 is separated and removed from the roll. The sleeve member 24 expands axially in response to removal of the pressure plate 28 to its normal position in abutting relation to retainer ring 25 as seen in FIG. 3.

In order to prevent wrapping of the hay around the roll spindles at the respective ends of the roll, a common problem in hay conditioners, a pair of ring shields are preferably provided at each end of the roll. Inner shields 29 are fixed to the inboard sides of the conditioner side frame plates 10 and 11 concentric with the axis of the roll journals 15. The inner shields 29 project axially inwardly a distance somewhat greater than half the distance between the frame plates 10 and 11 and the adjacent ring plate 25. An outer ring shield 30 is welded to the outboard side of each ring plate 25 and extends axially outwardly toward the adjacent side frame plate 10 or 11. As seen in FIG. 3, the shields 29 and 30 overlap to prevent hay from becoming wrapped about the roll spindles 20.

The improved hay conditioning and feeding action afforded by the present invention is attributable to the outer peripheral crop engaging surfaces of the rolls, and the coaction therebetween. As seen in section in FIG. 4, the roll surface is divided into two series of crushing surfaces: a radially outer series bearing the reference numerals 31, and a radially inner series bearing referencing numerals 32. The outer surfaces 31 are the radially outer extremities of the longitudinally extending ribs 33 (FIG. 1) while the inner surfaces 32 are the bottoms of the longitudinally extending recesses separating adjacent ribs 33. Each rib 33 has a leading side 34 and a trailing side 35 relative to the direction of rotation of the roll, which is indicated by the directional arrows 36 in FIGS. 2 and 4, for example. The leading and trailing sides 34 and 35 of each rib 33 are formed parallel to each other; consequently, each recess, which is defined by the leading side of one rib and the trailing side of the next adjacent rib, has sides which diverge outwardly from the bottom 32 of the recess. As distinguished from a conventional crimper, the crushing surfaces 31 and 32 of the present invention are considerably wider in the circumferential direction than the radial distance between the outer crushing surfaces 31 and the inner crushing surfaces 32.

In operation, the ribs and recesses of the respective rolls intermesh to crush hay between the radially outer crushing surfaces 31 of one roll and the radially inner crushing surfaces 32 of the other roll, thereby providing the full stem length crushing action of conventional crushing implements along with the aggressive feeding and crimping action afforded by intermeshing fins or ribs, as on a crimper. The self-destructive vibration normally accompanying crop treating rolls having intermeshing fins, is eliminated in the present invention by spiraling the ribs and recesses about the axis of the roll to provide continuous rolling contact between the intermeshing rolls. The diverging sides of the recesses afforded by the parallel relationship of the sides of the ribs facilitates the smooth meshing coaction of rolls at the high speed rotation required of a hay conditioner.

The sleeve members 24 are preferably formed with each rib spiraling through a ninety degree angular and extend from one end of the sleeve member 24 to the other end. Thus, the rib sections on each sleeve member are automatically properly aligned with the rib sections on the axially abutting sleeve members when the sleeves are inserted axially over the diametrically opposed longitudinal keys 21 and 22.

As in the case of conventional hay conditioners embodying intermeshing fins, the rolls of the present invention should be driven in timed relation to each other. Any of the conventional well known timed roll drive arrangements may be employed to drive the rolls of the present invention. It is, in fact, intended that rolls of the present construction may be substituted for existing rolls in many hay conditioners. Naturally, the rolls of the present invention may be assembled to a number of desired standard lengths by the use of more or fewer sleeve sections 24.

In FIG. 2, the upper roll 12 is indicated diagrammatically as being driven by an endless chain 38 from a drive sprocket 39. The chain 38 would entrain about a sprocket keyed to the elongated roll spindle 20 projecting from the left end of the rolls as seen in FIG. 1. The lower roll 14 may be driven, if desired, by the intermeshing coaction of the ribs of the respective rolls. Preferably, it is driven independently of the upper roll drive, as is well known in the art, in order that the rolls may be mounted to separate and pass foreign objects such as stones or the like therebetween.

What is claimed is:

1. A crop conditioning device for both crushing and crimping crop material comprising:

a frame adapted for travel forwardly over the ground;

first and second parallel transversely extending horizontally disposed crop conditioning rolls formed of relatively hard material;

each of said rolls having a periphery comprising a plurality of outwardly projecting spaced apart ribs extending continuously from one end to the other end thereof and angularly disposed with respect to the axes of said rolls and a plurality of recesses extending continuously between said ribs from one end of the rolls to the other in an angularly disposed relation;

each of said ribs having a radially outer crop crushing surface and each of said recesses having a bottom crop crushing surface disposed radially inwardly of said outer crushing surface of said ribs, said crushing surfaces each having substantially greater widths circumferentially of the rolls than the radial distance between said outer crushing surfaces and said bottom crushing surfaces.

means journalling said first and second rolls relatively near to each other on said frame so that the ribs of each of the rolls mesh throughout their length with recesses on the opposite rolls to crush and crimp crop material received between the rolls, and means connected to at least one of said rolls for rotating the rolls in opposite directions.

2. A hay conditioning device as recited in claim 1 wherein said first roller is spaced above and forwardly of said second roller.

3. A hay conditioning device as recited in claim 1 wherein one of said rolls is resilient and made of a hard rubber or rubber-like material.

4. A hay conditioning device as recited in claim 3 wherein said resilient roll comprises a sleeve on a cylindrical core member further characterized by the provision of a longitudinal key on said core projecting into a longitudinal slot in said sleeve, said key serving to prevent rotation of the sleeve relative to said core.

5. A hay conditioning device as recited in claim 3 wherein said resilient roll comprises a plurality of axially separable sections abutted together in end to end relation, each of said sections having continuous spiral ribs and recesses on the periphery thereof, and means engaging abutting sections and aligning the ribs and recesses of the respective abutting sections whereby each spiral rib and recess extends uninterrupted in a direction along the length of the roll.

6. A hay conditioning device as recited in claim 1 wherein each of the spiral ribs has a forward side and a trailing side relative to the direction of rotation of its associated roll, each of said recesses having sides defined by the trailing side of one rib and the leading side of the next adjacent rib, the forward side and trailing side of a given rib being parallel and said sides of a given recess diverging radially outwardly from the bottom crushing surface of the recess.

7. A hay conditioning device as recited in claim 1 wherein said crushing surfaces of said ribs and recesses are cylindrical and concentric with the axis of the roll.

8. A hay conditioning device as recited in claim 1 wherein both of said rolls are of the same diameter and construction and both are made of a hard rubber resilient material to facilitate full peripheral hay crushing engagement between the intermeshing ribs and recesses of the two rolls.

9. A crop conditioning device for both crushing and crimping crop material comprising:

a frame adapted for travel forwardly over the ground;

first and second parallel transversely extending horizontally disposed crop conditioning rolls formed of relatively hard material;

each of said rolls having a periphery comprising a plurality of outwardly projecting spaced apart spiral ribs extending continuously without interruption from one end of the roll to the other end thereof and a plurality of spiral recesses extending continuously and without interruption between said ribs from one end of the rolls to the other;

each of said ribs having a radially outer crop crushing surface and each of said recesses having a bottom crop crushing surface disposed radially inwardly of said outer crushing surface of said ribs, said crushing surfaces each having substantially greater widths circumferentially of the rolls than the radial distance between said outer crushing surfaces and said bottom crushing surfaces;

means journalling said first and second rolls relatively near to each other on said frame so that the ribs of each of the rolls mesh throughout their length with the recesses on the opposite rolls to crush and crimp crop material received between the rolls, and means connected to at least one of said rolls for rotating the rolls in opposite directions.

References Cited

UNITED STATES PATENTS

| | | |
|---|---|---|
| 2,464,438 | 3/1949 | Davies. |
| 2,535,485 | 12/1950 | Cover. |
| 2,963,841 | 12/1960 | Cunningham. |
| 3,085,384 | 4/1963 | Adee et al. |
| 3,115,737 | 12/1963 | Harrer et al. |
| 3,178,870 | 4/1965 | Kowalik. |

ANTONIO F. GUIDA, Primary Examiner